(12) United States Patent
Yamada et al.

(10) Patent No.: US 7,661,829 B2
(45) Date of Patent: Feb. 16, 2010

(54) PROJECTION DISPLAY APPARATUS

(75) Inventors: Akihiro Yamada, Tokyo (JP); Yoshinori Sato, Tokyo (JP); Akira Daijogo, Tokyo (JP); Motoo Takahashi, Tokyo (JP); Hiroshi Kida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 11/798,145

(22) Filed: May 10, 2007

(65) Prior Publication Data

US 2008/0043312 A1 Feb. 21, 2008

(30) Foreign Application Priority Data

Aug. 18, 2006 (JP) ............................. 2006-223178

(51) Int. Cl.
*G03B 21/14* (2006.01)

(52) U.S. Cl. ............................. 353/88; 353/38; 353/97

(58) Field of Classification Search .................... 353/38, 353/97, 88
See application file for complete search history.

(56) References Cited

U.S. PATENT DOCUMENTS

| | | | | |
|---|---|---|---|---|
| 6,755,538 | B2* | 6/2004 | Sugawara | 353/97 |
| 6,769,777 | B1* | 8/2004 | Dubin et al. | 353/97 |
| 6,854,851 | B2* | 2/2005 | Yamasaki et al. | 353/97 |
| 7,163,299 | B2* | 1/2007 | Lee | 353/99 |
| 7,185,990 | B2* | 3/2007 | Koga et al. | 353/97 |
| 2002/0036833 | A1 | 3/2002 | Miyata et al. | |
| 2006/0001838 | A1 | 1/2006 | Yoshii et al. | |
| 2006/0215247 | A1 | 9/2006 | Koide | |
| 2007/0035702 | A1 | 2/2007 | Shimizu et al. | |
| 2007/0064203 | A1* | 3/2007 | Sawai | 353/97 |

FOREIGN PATENT DOCUMENTS

| | | |
|---|---|---|
| EP | 1170959 A2 | 1/2002 |
| EP | 1382995 A1 | 1/2004 |
| JP | 4-9030 A | 1/1992 |
| JP | 2003-131322 A | 5/2003 |
| JP | 2003-241311 A | 8/2003 |
| JP | 2005-31103 A | 2/2005 |
| JP | 2005-301069 A | 10/2005 |

(Continued)

*Primary Examiner*—William C Dowling
(74) *Attorney, Agent, or Firm*—Birch, Stewart, Kolasch & Birch, LLP

(57) ABSTRACT

A projection display apparatus is provided which offers improved contrast while smoothly controlling the amount of light, with a simple structure and without deterioration of lifetime due to the heat of the light from a light source. This projection display apparatus includes a light valve, a light source for emitting light to the light valve, an integrator lens disposed on the optical path of the light propagating from the light source to the light valve, for making uniform the illuminance distribution of the light from the light source, and a shutter mechanism disposed on the light path, for controlling the amount of light that illuminates the light valve. The shutter mechanism has a pair of light-blocking members having cuts formed in their respective protruding sides to regulate the passage of light, and the pair of light-blocking members are moved straight to protrude/retract on the optical path, perpendicularly to the optical path from both sides of the optical path, so as to control the amount of the light according to the extent of their protrusion on the optical path.

8 Claims, 10 Drawing Sheets

FOREIGN PATENT DOCUMENTS

| | | |
|---|---|---|
| JP | 2006-251460 A | 9/2006 |
| JP | 2007-47339 A | 2/2007 |
| WO | WO-98/39684 A1 | 9/1998 |
| WO | WO 2005/026835 A1 | 3/2005 |
| WO | WO-2005/091628 A1 | 9/2005 |
| WO | WO-2006/053177 A2 | 5/2006 |

* cited by examiner

F I G . 3
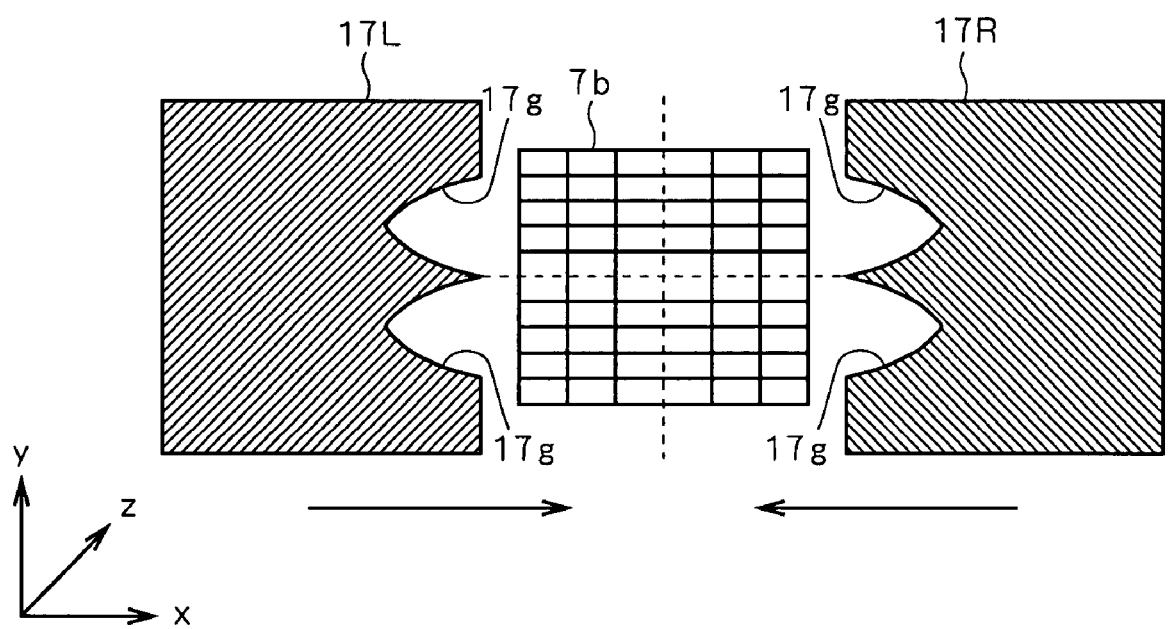

DISTRIBUTION OF LIGHT-SOURCE IMAGES AFTER EXIT FROM POLARIZATION CONVERSION ELEMENT

PROJECTION DISPLAY APPARATUS

BACKGROUND OF THE INVENTION

1. Field of the Invention

The present invention relates to a projection display apparatus using a light valve.

2. Description of the Background Art

In general, a conventional projection display apparatus mainly includes a light valve, a light source for emitting light to the light valve, a guiding optical system for guiding the light from the light source to the light valve, an integrator lens disposed on the optical path of the light from the light source to the light valve, for uniformizing the illuminance distribution of the light from the light source, and a projection lens for projecting images produced by the light valve onto a given screen.

In such a conventional projection display apparatus, various optical elements constituting the optical systems, such as the guiding optical system, the projection lens, etc., cause light leakage and stray light, and so the brightness/darkness in the image projected on the screen is not clear, and sufficient contrast cannot be obtained. The term "contrast" herein means the degree of brightness/darkness of an image.

In particular, in projection display apparatuses using liquid-crystal light valves, the contrast of images depend also on the performance of the liquid-crystal light valve, and there is a limit in improving the image contrast by image signal processing.

A method to solve this problem is to control the amount of light that illuminates the light valve according to the image signal, so as to improve the image contrast.

Then, a simplest method to control the amount of light that illuminates the light valve is to control the optical output of the light source used in the projection display apparatus to control the amount of light that illuminates the light valve. However, controlling the optical output of the light source is extremely difficult. Furthermore, in such methods of controlling the optical output of the light source, the brightness is varied in such short periods as can be perceived by human eyes, which causes flicker in the image projected on the screen.

As to techniques to solve this problem, a projection display apparatus is disclosed in which a light control means composed of a segmental liquid-crystal device, whose transmissivity can be controlled in each segment, is provided on the entrance side, or the exit side, or between, two lens arrays forming an integrator lens, and the transmissivity of each segment of the light control means is controlled on the basis of the image signal, whereby the amount of light illuminating the light valve can be controlled without controlling the optical output of the light source (i.e., without causing flicker in the image projected on the screen: for example, see Japanese Patent Application Laid-Open No. 2003-131322, Paragraph (0024), which is hereinafter referred to as Conventional Art 1).

A projection display apparatus according to another technique uses an amount-of-light control device in place of the light control means of Conventional Art 1, in which the amount-of-light control device uses light-blocking plates for blocking the optical path from above and below, or from right and left, or a diaphragm mechanism for blocking the optical path, whereby the amount of light illuminating the light valve can be controlled without controlling the optical output of the light source (for example, see Japanese Patent Application Laid-Open No. 2003-241311, Paragraph (0034) and FIG. 2, which is hereinafter referred to as Conventional Art 2).

A projection display apparatus according to still another technique uses light-blocking plates in place of the light control means of Conventional Art 1, in which the light-blocking plates are provided like hinged double doors on both sides of the optical path between two lens arrays, and are turned to control the extent of blocking of the optical path, whereby the amount of light illuminating the light valve can be controlled without controlling the optical output of the light source (for example, see Japanese Patent Application Laid-Open No. 2005-31103, Paragraphs (0073), (0074) and FIG. 15, which is hereinafter referred to as Conventional Art 3).

Also, a projection display apparatus according to still another technique uses light-blocking plates in place of the light control means of Conventional Art 1, in which the light-blocking plates are provided on the left and right sides and the upper and lower sides of the optical path between two lens arrays, and are slid approximately in parallel with the main surface of the lens array to block the optical path, whereby the amount of light illuminating the light valve can be controlled without controlling the optical output of the light source (for example, see Japanese Patent Application Laid-Open No. 2005-31103, Paragraph (0069) and FIG. 13, which is hereinafter referred to as Conventional Art 4).

However, in Conventional Art 1, the light control means, which is composed of liquid crystal, suffers from reduced lifetime due to the heat generated by the light from the light source (particularly, ultraviolet rays affect the lifetime of the light control means). In particular, when the light control means is disposed on the entrance side of, or between, the two lens arrays, a larger amount of heat is accumulated in the light control means and so the lifetime of the light control means is more likely to be reduced, because, in these positions, the light flux is less attenuated by influences of optical elements than in other positions, and therefore the light flux from the light source is more intensive in these positions.

Also, in Conventional Art 4 using light-blocking plates, the light-blocking plates have their forward ends formed flat, and so they cannot smoothly control the amount of light directed to the light valve when they are moved continuously. Thus, the amount of light cannot be smoothly controlled according to the image signal, to improve the contrast.

Conventional Art 2 using a diaphragm mechanism involves a complicated structure.

In Conventional Art 3 using light-blocking plates turned like hinged double doors, when the light-blocking plates are turned and their forward ends pass near the lens array closer to the light source, the shape of the forward ends may be imaged to the image projected on the screen, which will then appear as illuminance non-uniformity.

SUMMARY OF THE INVENTION

An object of the present invention is to provide a projection display apparatus which offers improved contrast through smooth control of the amount of light, with a simple structure and without deterioration of lifetime due to the heat of the light from a light source.

A projection display apparatus includes: a light valve; a light source that emits light to the light valve; an integrator lens disposed on the optical path of the light propagating from the light source to the light valve, so as to uniformize the illuminance distribution of the light from the light source; and a shutter mechanism disposed on the optical path to control the amount of light that illuminates the light valve. The shutter mechanism has a pair of light-blocking members respectively having cuts formed in their respective protruding sides to regulate passage of the light, and the pair of light-blocking members are moved straight to protrude/retract on the optical path, approximately perpendicularly to the optical path from both sides of the optical path, so as to control the amount of the light according to the extent of their protrusion on the optical path.

Thus, the shutter mechanism has a pair of light-blocking members having cuts formed in their respective protruding sides to regulate the passage of light, and the pair of light-blocking members are moved straight to protrude/retract on the optical path, approximately perpendicularly to the optical path from both sides of the optical path, so as to control the amount of the light according to the extent of their protrusion on the optical path. This makes it possible to improve the contrast through smooth control of the amount of light, with a simple structure and without deterioration of the lifetime due to the heat of the light from the light source.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of the configuration of a shutter mechanism 17a used in the first preferred embodiment;

DESCRIPTION OF THE PREFERRED EMBODIMENTS

First Preferred Embodiment

Figure 1:
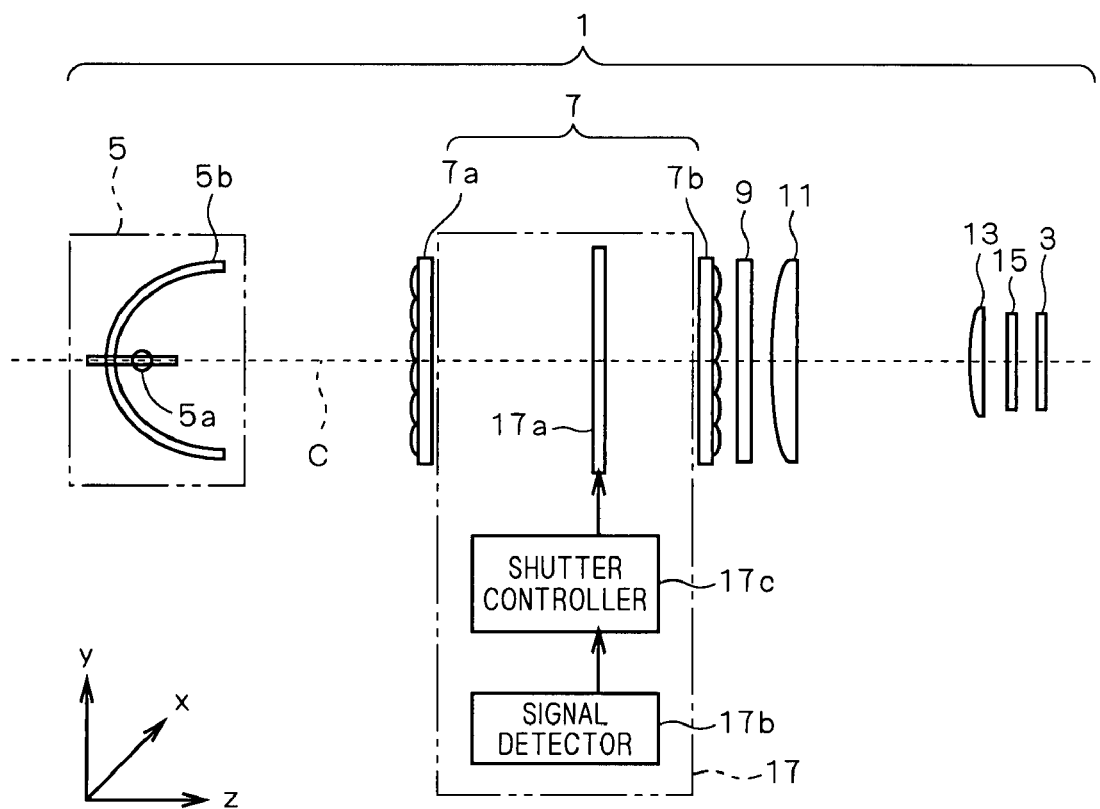
FIG. 1 is a schematic diagram illustrating the configuration of a projection display apparatus according to a first preferred embodiment.

As shown in FIG. 1, a projection display apparatus 1 according to a preferred embodiment includes a light valve 3, a light-source system 5 for emitting light to the light valve 3, an integrator lens 7 disposed on the optical path of the light from the light-source system 5 to the light valve 3, a polarization conversion element 9 disposed following the integrator lens 7, a condenser lens 11 disposed following the polarization conversion element 9, a field lens 13 disposed following the condenser lens 11, a polarizing plate 15 disposed following the field lens 13, and an amount-of-light control system 17 disposed on the optical path.

The projection display apparatus 1 further includes a projection lens following the light valve 3 and a screen following the projection lens, but FIG. 1 does not show these components because they are not closely related to the contents of the invention. Also, for the sake of convenience, FIG. 1 only shows a single optical path in a projection display apparatus having liquid-crystal light valves respectively on the R, G and B optical paths.

This preferred embodiment uses a liquid-crystal light valve as the light valve 5, but any light valve can be used. For example, a light valve using micro-mirrors or a light valve using reflection-type liquid crystal may be used.

The light-source system 5 includes a light source 5a and a reflecting mirror 5b that reflects the light from the light source 5a toward the light valve 3.

In general, the light source 5a can be a high pressure mercury lamp, a halogen lamp, or a xenon lamp, but any light-emitting device can be used. For example, an LED, laser, or EL can be used.

The reflecting mirror 5b has a paraboloidal surface or an ellipsoidal surface, for example, though not particularly restricted. It can take any shape and any structure as long as light is collected to the polarization conversion element 9. For example, the light entering the integrator lens 7 may be approximately parallel to the optical axis C, in which case the reflecting mirror 5b may be paraboloidal, or may be ellipsoidal and then, e.g., a concave lens is disposed between the light-source system 5 and the integrator lens 7 to make the light approximately parallel. When the reflecting mirror 5 is ellipsoidal and no concave lens is used, some measure may be taken, e.g., by providing the integrator lens 7 with decentration.

The integrator lens 7 includes a first lens array 7a and a second lens array 7b that is positioned downstream of the first lens array 7a at an interval. The lens arrays 7a and 7b are each composed of a plurality of convex lenses arranged in an array, and the convex lenses of the first lens array 7a and the convex lenses of the second lens array 7b are in correspondence with each other, with corresponding ones of the convex lenses being disposed right in front.

Figure 2:
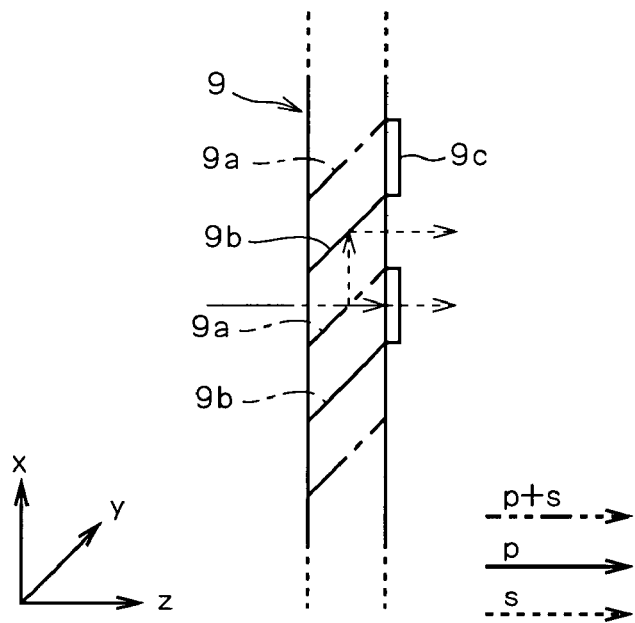
FIG. 2 is a schematic cross-sectional view of a polarization conversion element 9 used in the first preferred embodiment.

The polarization conversion element 9 converts the incident light flux into light of linear polarization of a single kind and emits the light. As shown in FIG. 2, the polarization conversion element 9 mainly includes: a plurality of polarization separation films 9a spaced at appropriate intervals in a direction vertical to the optical axis C (in the x direction) and inclined with respect to the optical axis C (e.g., at an angle of 45 degrees); a plurality of reflecting films 9b provided between the polarization separation films 9a and inclined with respect to the optical axis C (e.g., at an angle of 45 degrees); and λ/2 phase-difference plates 9c disposed behind the polarization separation films 9a.

With the polarization conversion element 9, the light incident on the polarization conversion element 9 is separated by the polarization separation films 9a into s-polarized light and p-polarized light. Then, the p-polarized light is passed through the polarization separation films 9a and polarization-converted into s-polarized light by the λ/2 phase-difference plates 9c behind the polarization separation films 9a, and then emerges from the polarization conversion element 9. On the other hand, the s-polarized light is reflected at the polarization separation films 9a and further reflected at the reflecting films 9b, and passed out from the polarization conversion element 9 without being polarization-converted. Accordingly, the flux of light emerging from the polarization conversion element 9 is almost all s-polarized light.

The amount-of-light control system 17 includes a shutter mechanism 17a disposed between the first lens array 7a and the second lens array 7b, a signal detector 17b for detecting the image signal inputted to the light valve 3 and calculating a ratio of amount-of-light (a relative ratio of the amount of light that is to be applied to the light valve 3) on the basis of the detected results, and a shutter controller 17c for controlling the opening and closing of the shutter mechanism 17a on the basis of the ratio of amount-of-light calculated by the signal detector 17b.

As shown in FIG. 3, the shutter mechanism 17a has a pair of light-blocking members 17L and 17R that are moved straight by the shutter controller 17c to protrude and retract approximately perpendicularly to the optical path, from both sides of the optical path, so as to control the amount of light (that illuminates the light valve 3) according to the extent of their protrusion on the optical path. The light-blocking members 17L and 17R each have cuts 17g (for example, concave cuts) for regulating passage of light, and the cuts 17g are formed in center portions of their respective protruding sides, symmetrically with each other (about the y axis). The shape of the cuts 17g is not particularly restricted, but they may be formed in a concave-curve shape, approximately parabolic shape, or approximately semi-elliptical shape.

Here, with the light-blocking members 17L and 17R, as shown in FIG. 3, for example, cuts 17g for regulating the passage of light through the upper half of the second lens array 7b (the integrator lens 7) are formed in the upper half portions of the protruding sides of the light-blocking members 17L and 17R, and cuts 17g for regulating the passage of light through the lower half of the second lens array 7b are formed in the lower half portions of the sides (in other words, the area of the second lens array 7b is vertically and laterally divided into four equal parts (the divided parts are sequentially referred to, counter-clockwise from the upper-right part, as a first quadrant, a second quadrant, a third quadrant, and a fourth quadrant), and the cut 17g corresponding to the first quadrant of the second lens array 7b and the cut 17g corresponding to its fourth quadrant are formed in the protruding side of the light-blocking member 17R, and the cut 17g corresponding to the second quadrant of the second lens array 7b and the cut 17g corresponding to its third quadrant are formed in the protruding side of the light-blocking member 17L).

The shutter mechanism 17a can be shifted from its full-open state to its full-closed state as the light-blocking members 17L and 17R are moved, e.g., as shown in FIGS. 4A to 4K, as 4A→4B→4C→4D→4E→4F→4G→4H→4I→4J→4K.

Figure 4:
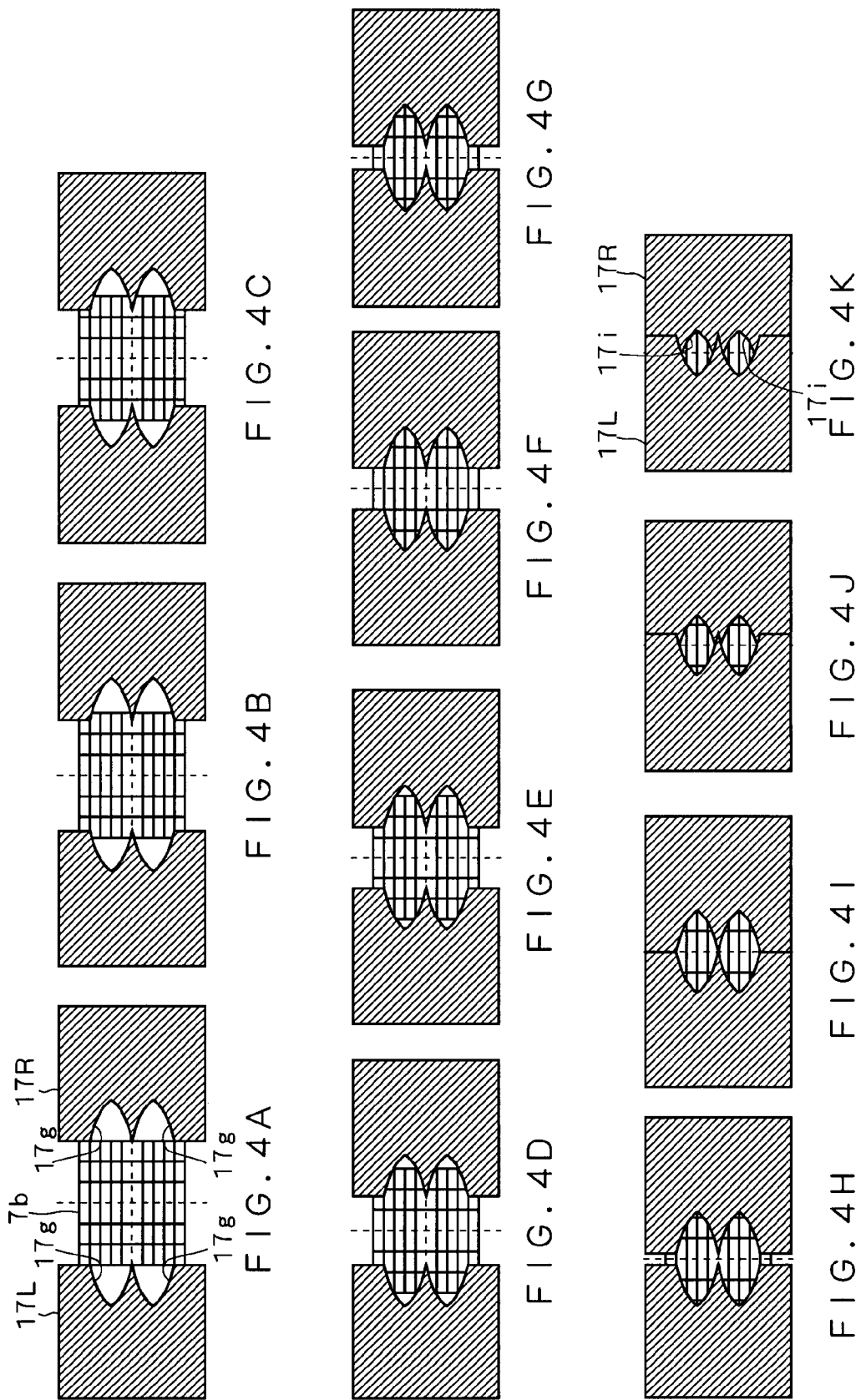
FIGS. 4A to 4K are diagrams illustrating the shutter mechanism 17a of FIG. 3 being driven step by step from its full-open state of FIG. 4A to its full-closed state of FIG. 4K.

FIG. 4A illustrates the light-blocking members 17L and 17R in their retracted positions (i.e., the shutter mechanism 17a is full opened), FIGS. 4B to 4J sequentially illustrate the light-blocking members 17L and 17R being moved step by step (=0.4 cell) to protrude on the optical path from the retracted positions of FIG. 4A, and FIG. 4K illustrates the light-blocking members 17L and 17R in their fully protruding positions (i.e., the shutter mechanism 17a is full closed). Here, the light-blocking members 17R and 17L are moved symmetrically with each other.

Figure 6:
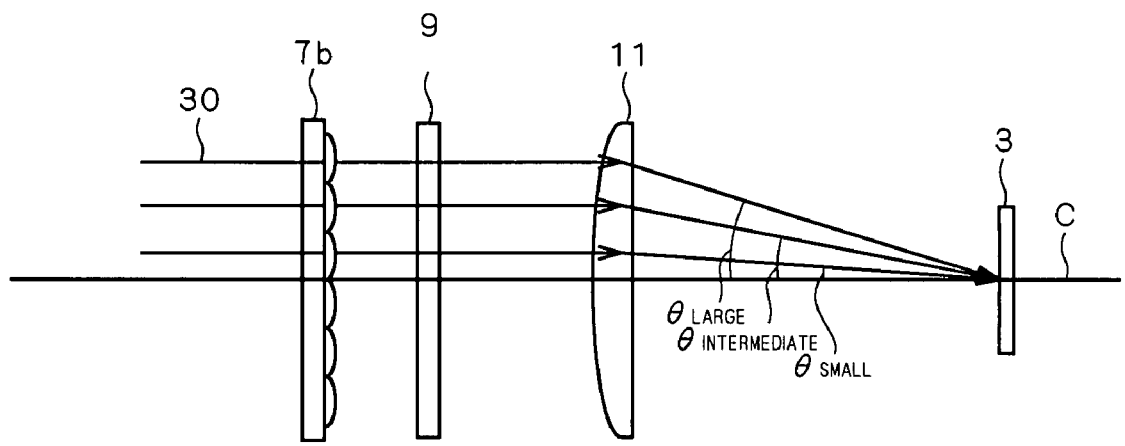
FIG. 6 is a diagram illustrating that the angle of incidence of light impinging on the light valve 3 differs depending on the area in which it passed through a second lens array 7b.
Figure 7:
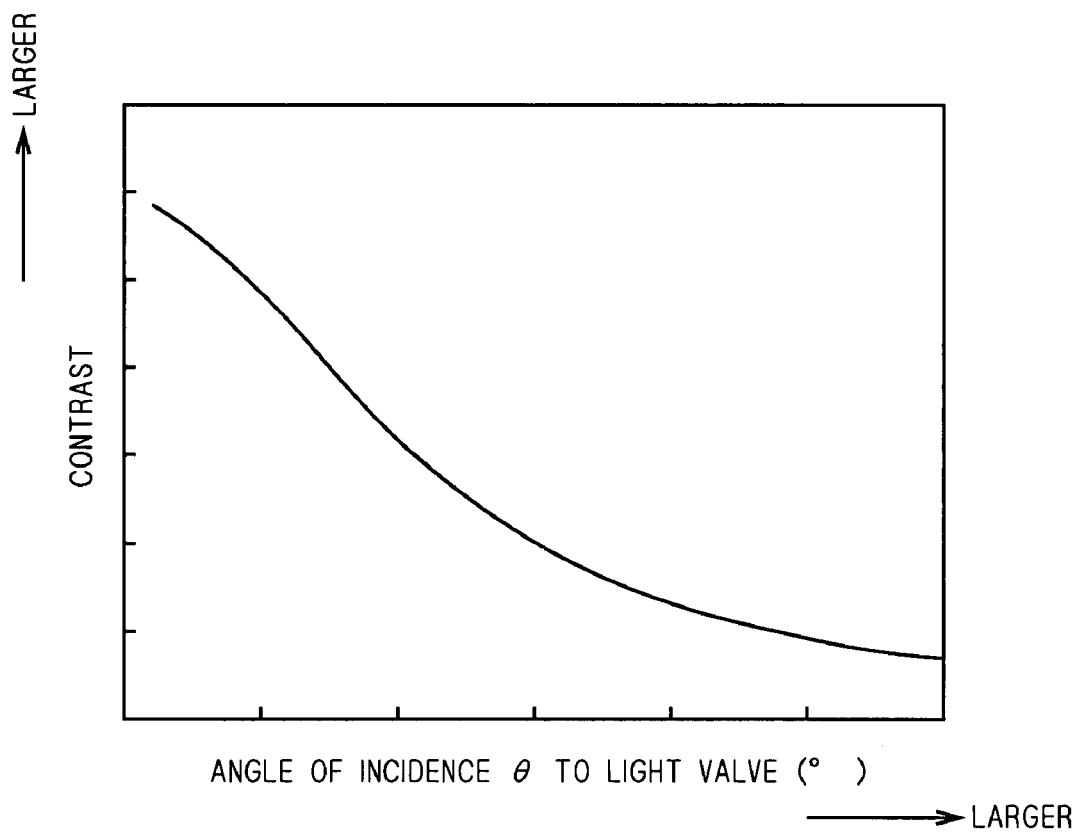
FIG. 7 is a graph illustrating a relation between the angle of incidence to the light valve and contrast.

In this process, the light is blocked sequentially from the portion that passes through the peripheral area of the second lens array 7b, because the cuts 17g, e.g., of a concave-curve shape, approximately parabolic shape, or approximately semi-elliptical shape, are formed in the protruding sides of the light-blocking members 17L and 17R. In general, as shown in FIG. 6, the light 30 propagating out through peripheral cells of the second lens array 7b impinges on the light valve 3 at a larger angle of incidence, and as shown in FIG. 7, the contrast decreases as the angle of incidence of the light impinging on the light valve 3 increases, because of characteristics of the light valve 3. Thus, the cuts 17g, e.g., of a concave-curve shape, approximately parabolic shape, or approximately semi-elliptical shape, are formed in the light-blocking members 17L and 17R, and they thus block the light sequentially from the portion that passes through the peripheral area of the second lens array 7b, whereby the amount of light that illuminates the light valve 3 can be reduced while preventing a reduction of contrast.

In the full-closed state shown in FIG. 4K, the cuts 17g of the light-blocking members 17L and 17R form two openings 17i that allow light transmission only through the areas of the second lens array 7b where largest amounts of light pass, i.e., in the area slightly shifted upward from the center or the optical axis C (in this example, cells separated upward from the center by some cells (second, third cells from the center)) and the area slightly shifted downward from the center (cells separated downward from the center by some cells (second, third cells from the center)).

Now, the position to dispose the shutter mechanism 17a is described. Since the focal position of the second lens array 7b is in the vicinity of the first lens array 7a, the shape of the cuts 17g of the light-blocking members 17L and 17R (hereinafter referred to as shutter shape) is more likely to be imaged to the light valve 3 when the shutter mechanism 17a is positioned near the first lens array 7a. If the shutter shape is imaged to the light valve 3, the shutter shape is viewed as illuminance non-uniformity in the image projected on the screen. Accordingly, it is preferable to position the shutter mechanism 17a in the vicinity of the second lens array 7b on the side upstream of the second lens array 7b. For example, the shutter mechanism 17a may be disposed in contact with the second lens array 7b.

The shutter mechanism 17a may be positioned between the second lens array 7b and the polarization conversion element 9. In this case, too, it is possible to prevent the shutter shape from being imaged to cause illuminance no-uniformity in the image projected on the screen.

The shutter mechanism 17a may be configured as any mechanism as long as the light-blocking members 17L and 17R straightly move onto the optical path to protrude/retract between both sides, approximately perpendicularly to the optical path. For example, it can be a mechanism that uses a slider-crank mechanism to convert rotational motion into straight motion.

In the projection display apparatus 1 thus constructed, the light from the light-source system 5 enters the first lens array 7a as a flux of light approximately parallel to the optical axis C, is divided by the individual convex lenses (cells) of the first lens array 7a, and passed through the corresponding convex lenses of the second lens array 7b, whereby the illuminance distribution is made uniform. Then, the light transmitted through the second lens array 7b propagates through the polarization conversion element 9 and is thus approximately all converted into s-polarized light, which is then condensed through the condenser lens 11. The condensed light is again made approximately parallel to the optical axis C by the field lens 13, and only the s-polarized light that has been polarization-converted by the polarization conversion element 9 is passed through the polarizing plate 15 to illuminate the light valve 3. An image produced by the light valve 3 is then projected onto a screen (not shown) through a projection lens (not shown).

During this process, the signal detector 17b detects the image signal inputted to the light valve 3, and the shutter controller 17c controls the shutter mechanism 17a on the basis of the detection, so as to improve the contrast of the image on the screen (i.e., the light-blocking members 17L and 17R are straightly driven to protrude/retract on the optical path to decrease/increase the amount of light that illuminates the light valve 3).

Figure 5:
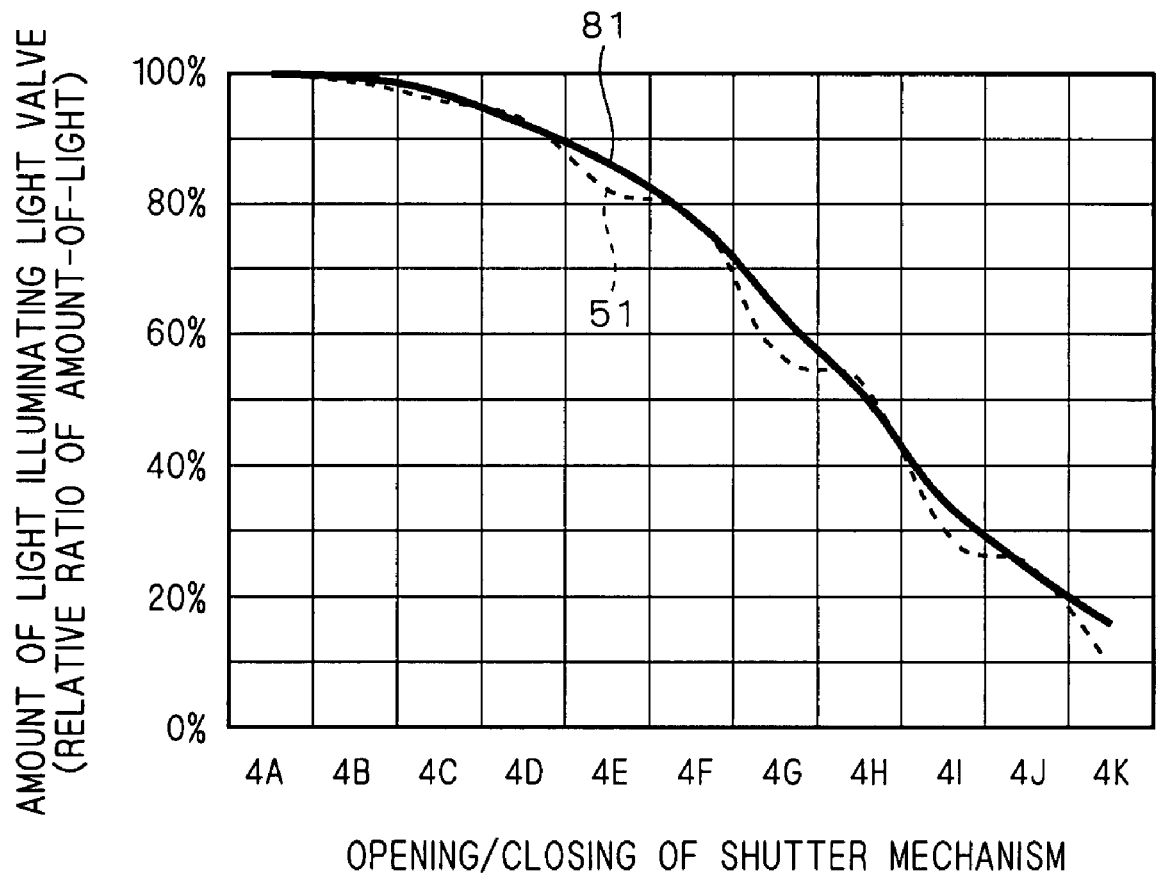
FIG. 5 is a diagram showing an example of a graph illustrating a relation between the amount of light that illuminates a light valve 3 and the opening/closing of the shutter mechanism 17a in the first preferred embodiment (curve 81), and a relation between the amount of light illuminating the light valve 3 and the opening/closing of a shutter mechanism 17a in a conventional example (curve 51)

FIG. 5 is an example of a graph showing a relation between the opening/closing (i.e., the extent of protrusion of the light-blocking members 17L and 17R on the optical path) of a conventional shutter mechanism having flat sides and a single cut formed in the center of each side and the amount of light illuminating the light valve 3 (the curve 51), and a relation between the opening/closing of the shutter mechanism shown in FIGS. 4A to 4K (i.e., the extent of protrusion of the light-blocking members 17L and 17R on the optical path) and the amount of light illuminating the light valve 3 (the curve 81). The graph shows actual measurements about the relation between the opening/closing of the shutter mechanism shown in FIGS. 4A to 4K and the amount of light illuminating the light valve 3. In FIG. 5, the vertical axis shows a relative ratio of amount-of-light, where it is assumed that the amount of light to the light valve 3 is 100% when the shutter mechanism 17a is full opened as shown in FIG. 4A (i.e., when the light-blocking members 17L and 17R are retracted in both sides of the optical path). The horizontal axis of FIG. 5 shows the opening/closing of the shutter mechanism 17a (FIGS. 4A to 4K).

In FIG. 5, the curves 51 and 81 show the relations between the amount of light to the light valve 3 and the opening/closing of the shutter mechanism 17a (i.e., the extent of protrusion of the light-blocking members 17L and 17R on the optical path). As shown in this diagram, it is appreciated that the amount of light that illuminates the light valve 3 gradually decreases as the shutter mechanism 17a closes (i.e., as the light-blocking members 17L and 17R protrude further). That is, it shows that the amount of light can be controlled by using the shutter mechanism 17a. The curve 51 shows a conventional example and the curve 81 shows that shown in FIGS. 4A to 4K.

It is seen from the curve 81 of FIG. 5 that the amount of light that illuminates the light valve 3 more smoothly decreases (with no considerable irregularities) as the shutter mechanism 17a is gradually closed, as compared with that of the conventional shutter mechanism (curve 51) having flat sides and a single cut in the center of each side (Feature 1).

It is also seen from the curve 81 of FIG. 5 that the amount of light that illuminates the light valve 3 decreases not rapidly but slowly in the range of relative ratio of amount-of-light of 40% or less, as compared with that of the conventional shutter mechanism (curve 51) having flat sides and a single cut in the center of each side (Feature 2).

Also, actually conducted experiments showed that the illuminance distribution of the light that illuminates the light valve 3 is uniform when the shutter mechanism 17a is full closed (FIG. 4K), with no illuminance non-uniformity observed on the screen (Feature 3).

Thus, it is seen from Features 1 to 3 that, when the light-blocking members 17L and 17R have the cuts 17g as shown in FIG. 3 (i.e., when the light-blocking members 17L and 17R have the cuts 17g formed in the upper and lower halves of their respective sides), the amount of light that illuminates the light valve 3 can be controlled more smoothly throughout the entire range of opening/closing of the shutter mechanism 17a, than when the light-blocking members have flat sides and a single cut in each side as in the conventional example (i.e., than when the light-blocking members 17L and 17R each have a single cut in the center of the side). It is also seen that, when the shutter mechanism 17a is full closed, the illuminance distribution of the light that illuminates the light valve 3 is uniform and no illuminance non-uniformity occurs on the screen.

Figure 8:
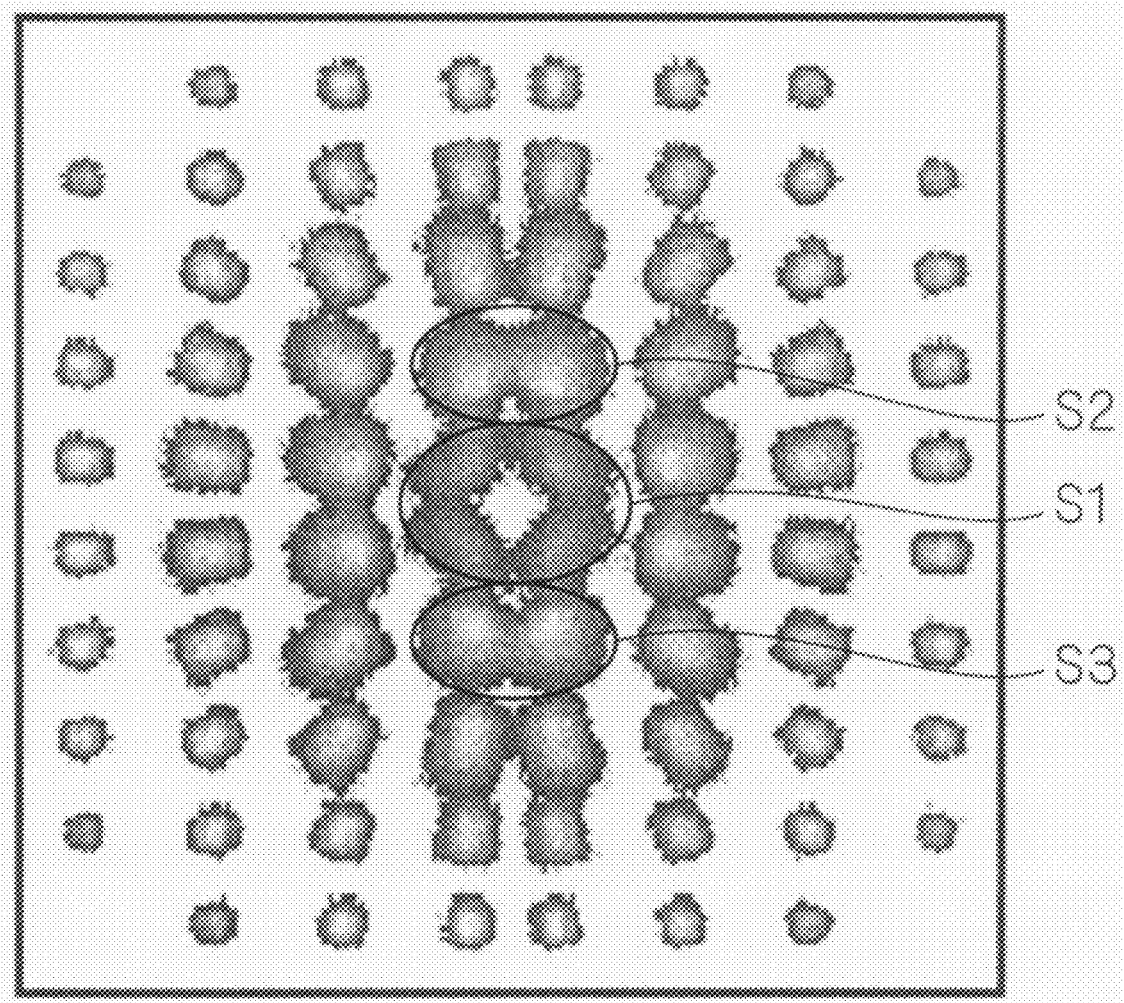
FIG. 8 is a diagram showing an example of the distribution of light-source images formed on the second lens array 7b.

FIG. 8 is a graph showing the results of a simulation about the distribution of the amounts of light (brightness) that passes through the second lens array 7b (in other words, the distribution of light-source images formed on the second lens array 7b), where different amounts of light are shown with different tones. As can be seen from the diagram, the amount of light varies concentrically around the center (the optical axis C) of the second lens array 7b. The amount of light is relatively low in the cells (four cells) S1 located in the center of the second lens array 7b, and the amount of light is relatively high in the cells separated outward from the center by some cells (second, third cells from the center), and the amount of light gradually decreases toward outer cells (particularly, the amount of light is highest in the cells S2 (see FIG. 8) separated upward from the center by some cells (second, third cells from the center) and in the cells S3 (see FIG. 8) separated downward from the center by some cells (second, third cells from the center)) (Feature A).

Figure 9:
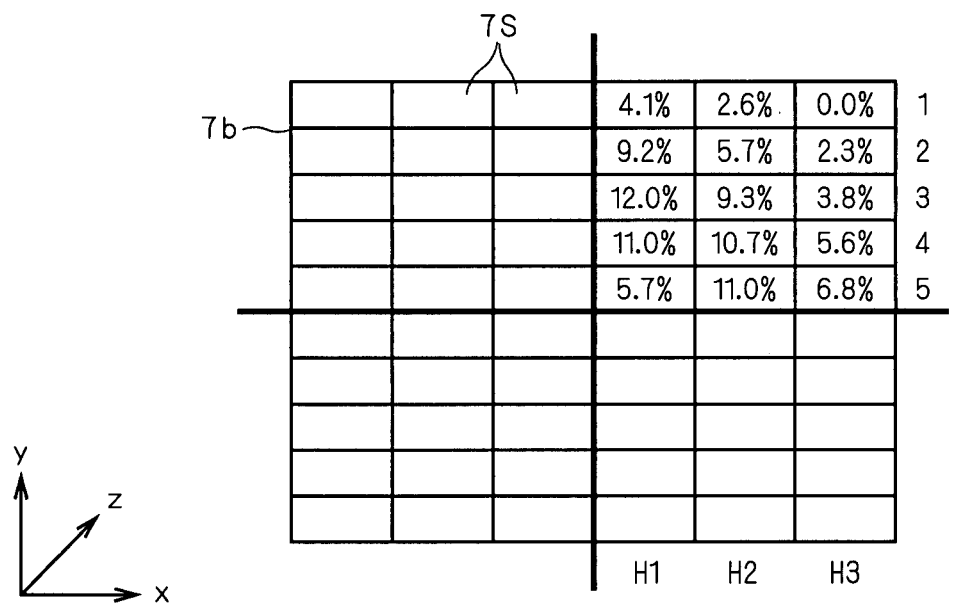
FIG. 9 is a diagram showing values of the amount of light that passes through individual cells 7s of the second lens array 7b, where the values were calculated by a simulation and are shown for individual cells 7s.
Figure 10:
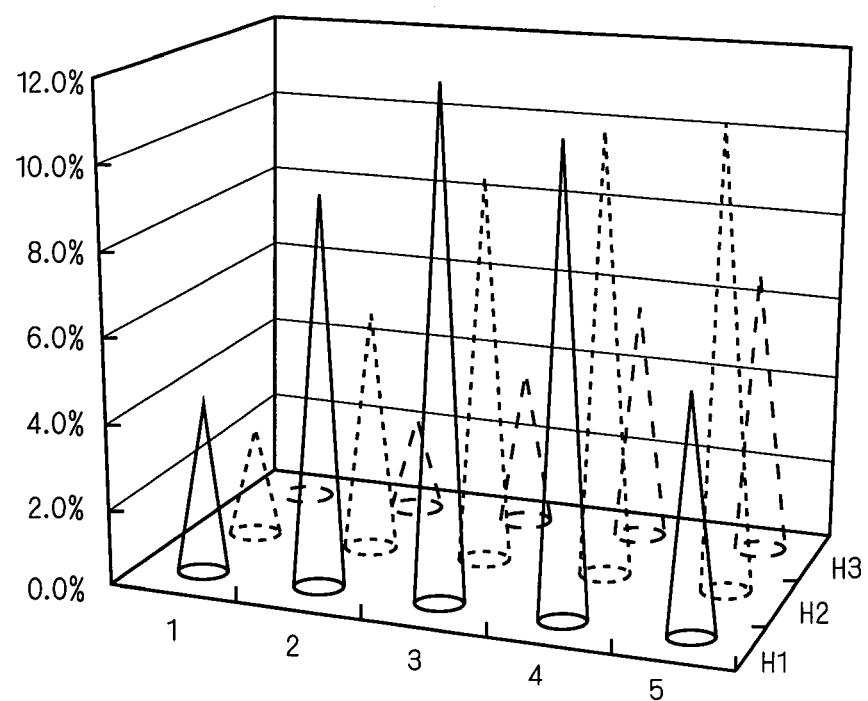
FIG. 10 is a bar chart showing the results of FIG. 9.

FIG. 9 is a graph showing values calculated by a simulation about the amounts of light passing through the individual cells 7s of the second lens array 7b, where the values are shown for individual cells 7s (it should be noted that the second lens array 7b is symmetrical in vertical and lateral directions and so the graph only shows the values about the first quadrant, and the entire first quadrant is normalized to 100%). FIG. 10 is a bar chart showing the results of FIG. 9. It is seen also from FIGS. 9 and 10 that the distribution of the amounts of light passing through the second lens array 7b has the Feature A.

Figure 11:
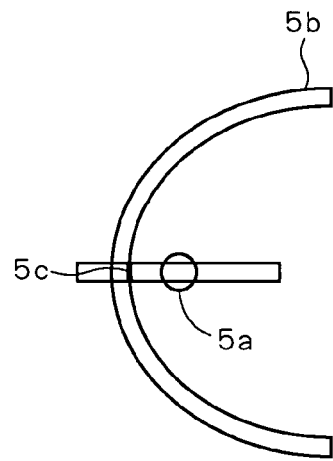
FIG. 11 is an enlarged view of a light-source system 5.
Figure 12:
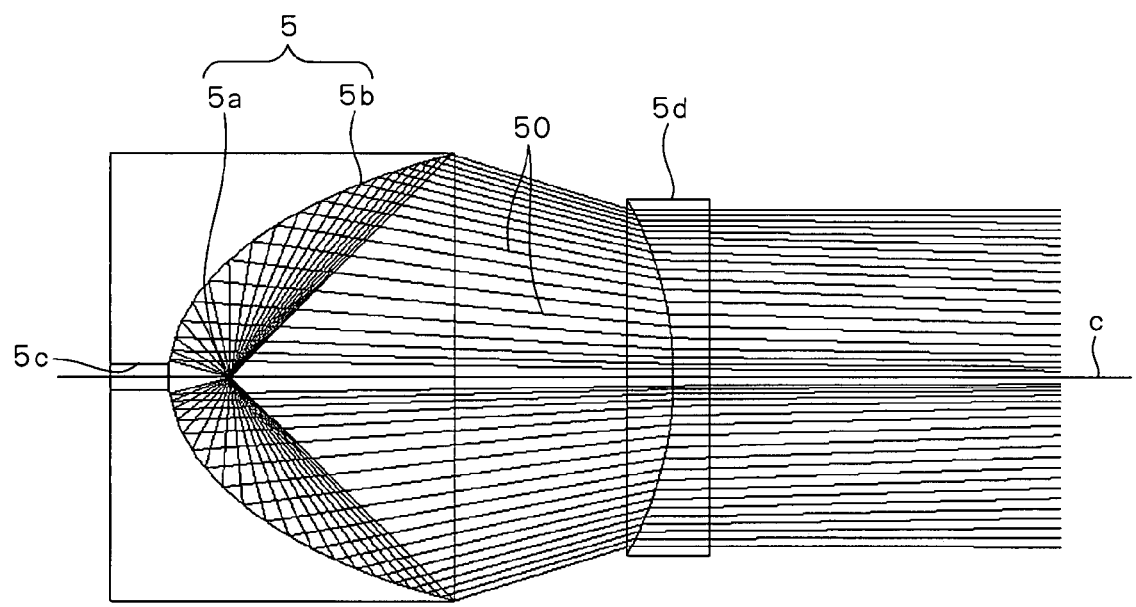
FIG. 12 is a diagram showing the results of a simulation about the reflection of light from the light source 5a reflected at the reflecting mirror 5b.

The amount of light in the cells S1 in the center of the second lens array 7b is relatively low because of the following reason. That is, the portion 5c (see FIG. 11) of the reflecting mirror 5b that is right behind the light source 5a has a hole for a light-emitting tube, and therefore that portion 5c does not form a reflecting mirror. FIG. 12 shows a simulation about the light from the light source 5a reflected at such a reflecting mirror 5b. It is seen from this diagram that almost no light reflection occurs in the rear portion 5c of the reflecting mirror 5b, and therefore the amount of light that passes on the optical axis C, and hence the amount of light that passes through the central cells S1 of the second lens array 7b, is relatively low as mentioned above. In FIG. 12, the reference character 5d indicates a concave lens disposed so that the light 50 propagating from the light-source system 5 to the integrator lens 7 is approximately parallel to the optical axis C.

It is seen from FIG. 8 that, in the conventional example having flat sides and a single cut in the center of each side, the shape of the cuts closely coincides with the concentric circles of the amount-of-light distribution in the second lens array 7b. As a result, when the light-blocking members are driven, the shape of their cuts sequentially blocks the concentric bright and dark portions of the second lens array 7b, and so the curve 51 of FIG. 5 has irregularities. In contrast, when the light-blocking members 17L and 17R have the cuts 17g as shown in FIG. 3, the shape of the cuts 17g does not coincide with the concentric circles of the amount-of-light distribution in the second lens array 7b. As a result, the light-blocking members 17L and 17R, when driven, do not sequentially block the concentric bright and dark portions of the second lens array 7b, and so the curve 81 of FIG. 5 is smooth (without irregularities). The Feature 1 is obtained for this reason.

Also, in this preferred embodiment, as can be seen from FIGS. 8 and 4K, the shutter mechanism 17a, when closed, does not block the light that passes through the areas of the second lens array 7b that transmit largest amounts of light, or it does not block the light that passes through the cells S2 separated upward from the center by some cells (second, third cells from the center) and the cells S3 separated downward from the center by some cells (second, third cells from the center). Accordingly, as shown by the curve 81 of FIG. 5, the amount of light illuminating the light valve 3 decreases not rapidly but slowly, especially in the range of relative ratio of amount-of-light of 40% or lower. In contrast, in the conventional example having flat sides and a single cut in the center of each side, the shutter mechanism 17a, when closed, blocks the light passing through the cells S2 and S3 of the second lens array 7b, and therefore, as can be seen from the curve 51 of FIG. 5, the amount of light illuminating the light valve 3 rapidly decreases especially in the range of relative ratio of amount-of-light of 40% or lower. The Feature 2 is obtained for this reason.

Also, in this preferred embodiment, a sufficient amount of light is incident on the light valve 3 because the shutter mechanism 17a, when full closed, does not block the light that passes through the areas of the second lens array 7b that transmit largest amounts of light, or it does not block the light that passes through the cells S2 separated upward from the center by some cells (second, third cells from the center) and the cells S3 separated downward from the center by some cells (second, third cells from the center). In contrast, in the conventional example having flat sides and a single cut in the center of each side, a sufficient amount of light is not incident on the light valve 3 because the shutter mechanism 17a, when full closed, blocks the light passing through the cells S2 and S3 of the second lens array 7b. The Feature 3 is obtained for this reason.

According to the projection display apparatus 1 thus constructed, the light-blocking members 17L and 17R respectively have the cuts 17g formed in the upper halves of their respective protruding sides to regulate the passage of light through the upper half of the integrator lens 7, and the cuts 17g formed in the lower halves of their respective protruding sides to regulate the passage of light through the lower half of the integrator lens 7. This makes it possible to improve the contrast while more smoothly controlling the amount of light, as compared with the conventional example having flat sides and a single cut in the center of each side.

In particular, in the range of relative ratio of amount-of-light of 40% or less, as can be seen from FIG. 5, the amount of light that illuminates the light valve 3 more slowly decreases, than in the conventional example having flat sides and a single cut in the center of each side (the curve 51). This offers improved controllability of the amount of light illuminating the light valve 3 when the signal detector 17b detects a signal of a small amount of light.

Also, particularly when the shutter mechanism 17a is full closed, a sufficient amount of light is incident on the light valve 3 and the illuminance distribution of the light illuminating the light valve 3 is uniform, and therefore illuminance non-uniformity on the screen is prevented.

Also, with the shutter mechanism 17a, the pair of light-blocking members 17L and 17R respectively have the cuts 17g formed in their respective protruding sides to regulate passage of light, and are straightly driven to protrude/retract on the optical path, approximately perpendicularly to the optical path from both sides of the optical path, so as to control the amount of light from the light source 5a according to the extent of their protrusion on the optical path. Accordingly, it is possible to improve the contrast through smooth control of the amount of light, with a simple structure and without deterioration of lifetime due to the heat of the light from the light source 5a. In particular, the contrast can be smoothly controlled because of the formation of the cuts 17g in the protruding sides of the light-blocking members 17L and 17R, and the deterioration of lifetime due to the heat of the light from the light source 5a is avoided because the shutter mechanism 17a does not use liquid crystal.

Also, the light-blocking members 17L and 17R are structured so that they are moved straight to protrude/retract on the optical path, approximately perpendicular to the optical path from both sides of the optical path (i.e., they are not turned like those of Conventional Art 3), and the light-blocking members 17L and 17R are positioned in the vicinity of the second lens array 7b on the side upstream thereof. This prevents the shutter shape of the light-blocking members 17L and 17R from being imaged with the image emitted from the light valve 3 to cause illuminance non-uniformity.

Second Preferred Embodiment

Figure 13:
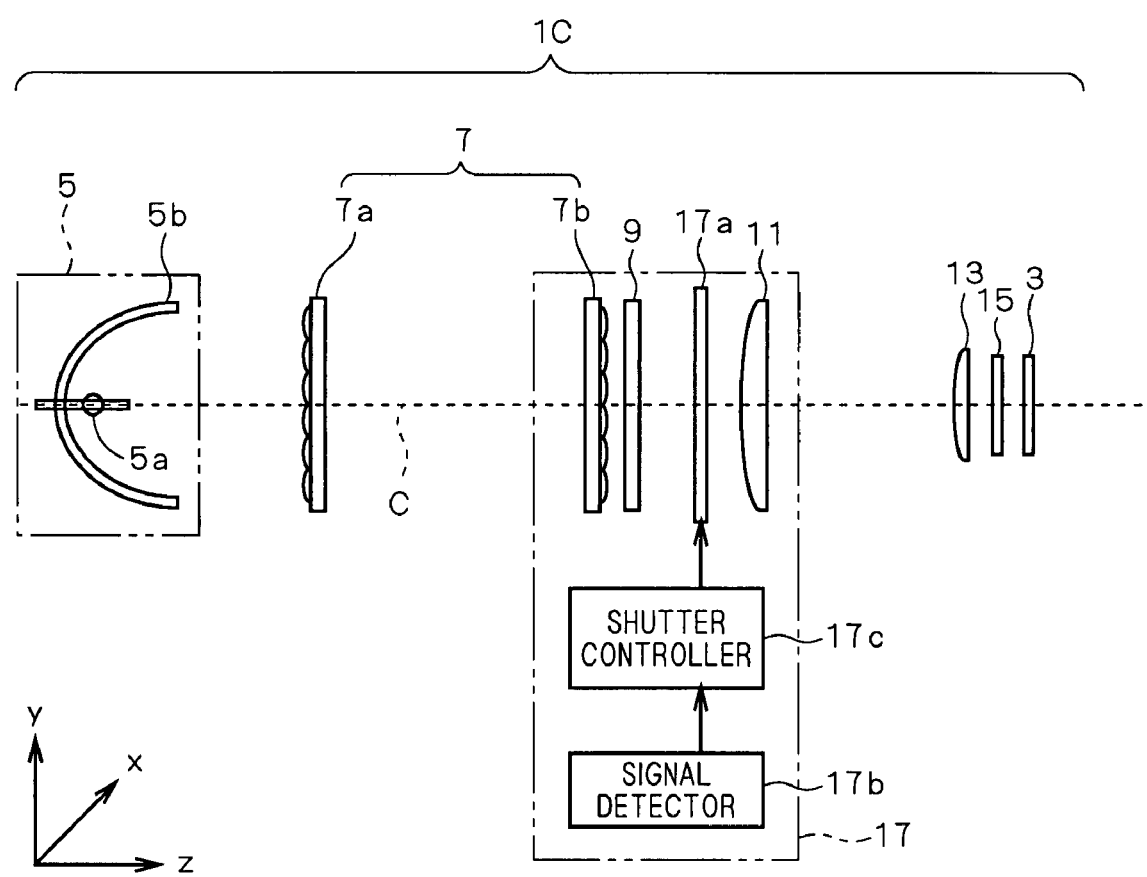
FIG. 13 is a schematic diagram illustrating the configuration of a projection display apparatus according to a second preferred embodiment.

In the projection display apparatus 1 of the first preferred embodiment, the shutter mechanism 17a is positioned between the first lens array 7a and the second lens array 7b. However, as shown in FIG. 13, a projection display apparatus 1C of this preferred embodiment has the shutter mechanism 17a positioned downstream of the polarization conversion element 9 (for example, in FIG. 13, between the polarization conversion element 9 and the condenser lens 11). In other respects, this preferred embodiment is configured the same as the first preferred embodiment.

Figure 14:
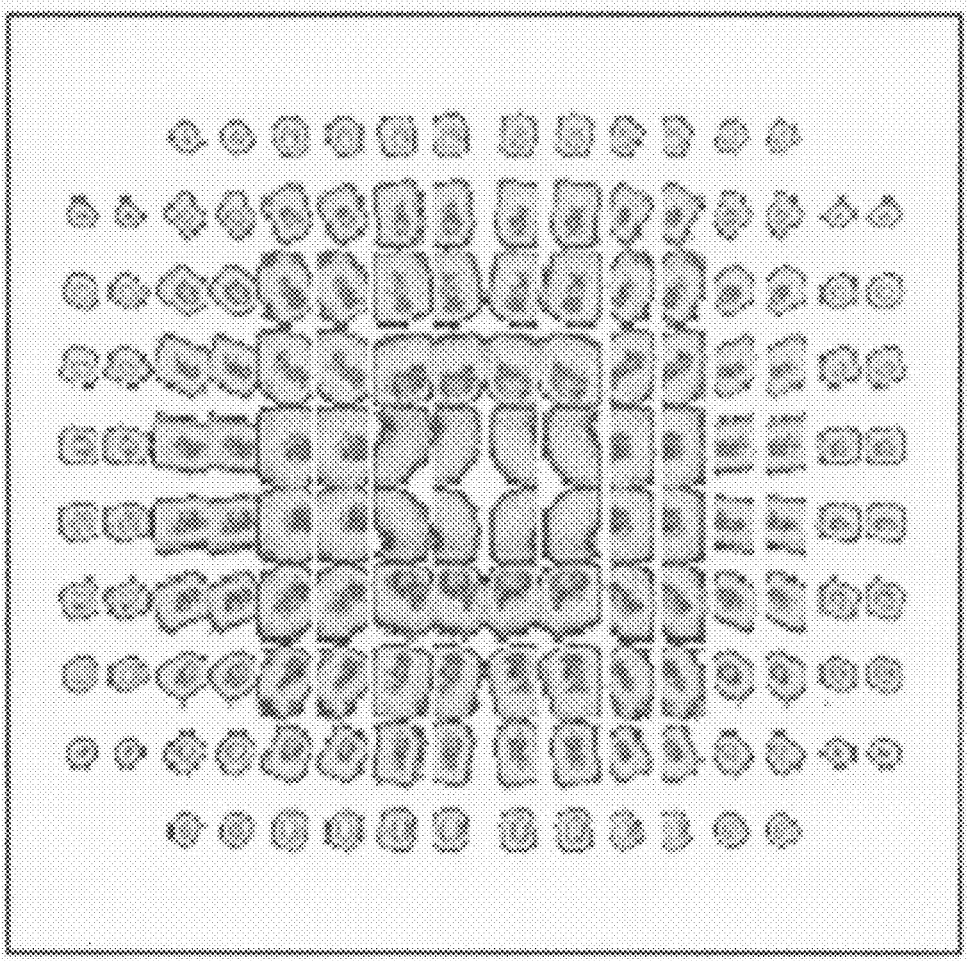
FIG. 14 is a diagram showing an example of the distribution of light-source images of light passing through the polarization conversion element 9.

As shown in FIG. 14, in the distribution of light-source images formed by the flux of light passing through the polarization conversion element 9, the number of light-source images is doubled as compared with that in the distribution of light-source images formed in the second lens array 7b (FIG. 8). Accordingly, when the shutter mechanism 17a is disposed following the polarization conversion element 9 as shown in this preferred embodiment, the amount of light that illuminates the light valve 3 can be controlled more smoothly by opening/closing the shutter mechanism 17a (i.e., the contrast can be controlled more smoothly).

Also, when the shutter mechanism 17a is positioned between the first lens array 7a and the second lens array 7b as shown in the first preferred embodiment, particularly when the shutter mechanism 17a is disposed in the vicinity of the first lens array 7a, the shutter shape is imaged to the light valve 3 because the conjugate position of the light valve 3 is in the vicinity of the first lens array 7a. Also, particularly when the shutter mechanism 17a is disposed between the vicinity of the first lens array 7a and the second lens array 7b, the shutter shape may be imaged to the light valve 3, depending on the shape of the light source 5a, because the focal depth of the second lens array 7b becomes deeper as the shape of the light source 5a is closer to point light source.

However, in this preferred embodiment, the shutter mechanism 17a is disposed to follow the polarization conversion element 9, and so the shutter shape is not imaged to the light valve 3, regardless of the conjugate position of the light valve 3 and the shape of the light source 5a.

That is, when the shutter mechanism 17a is positioned to follow the polarization conversion element 9 as shown in this preferred embodiment, the shutter mechanism 17a is capable of more smoothly controlling the amount of light that illuminates the light valve 3, without the shutter shape being imaged to the light valve 3.

Also, considering the controllability of the shutter mechanism 17a, it is preferable to dispose the shutter mechanism 17a between the polarization conversion element 9 and the condenser lens 11, and in the vicinity of the condenser lens 11, where the light passes in a larger area. This is because, as the light propagates from the condenser lens 11 to the light valve 3, the area of light passage becomes smaller to become closer to the area of the light valve 3, and then it becomes difficult to control the shutter mechanism 17a.

While the invention has been described in detail, the foregoing description is in all aspects illustrative and not restrictive. It is understood that numerous other modifications and variations can be devised without departing from the scope of the invention.

What is claimed is:

1. A projection display apparatus comprising:
   a light valve;
   a light source that emits light to said light valve;
   an integrator lens that is disposed on an optical path of said light propagating from said light source to said light valve and that makes uniform an illuminance distribution of the light from said light source; and
   a shutter mechanism that is disposed on said optical path and that controls an amount of said light that illuminates said light valve,
   said shutter mechanism comprising a pair of light-blocking members having cuts formed in their respective protruding sides to regulate passage of said light, said pair of light-blocking members being moved straight to protrude/retract on said optical path, approximately perpendicularly to said optical path from both sides of said optical path, so as to control the amount of said light according to an extent of their protrusion on said optical path, wherein
   a largest amount of passage light appears in two portions of an upper half of said integrator lens and a lower half of said integrator lens,
   in each said light-blocking member, said cut includes a cut that regulates passage of said light through said upper half of said integrator lens so as not to block said largest amount of passage light and a cut that regulates passage of said light through said lower half of said integrator lens so as not to block said largest amount of passage light, and
   in a full-closed state of said pair of light-blocking members, each of said cuts forms a pair of openings that allows light transmission only through said largest amount of passage light.

2. The projection display apparatus according to claim 1, wherein, when said integrator lens includes a first lens array and a second lens array that is disposed downstream of said first lens array at an interval, said shutter mechanism is disposed in a vicinity of said second lens array on a side upstream of said second lens array.

3. The projection display apparatus according to claim 1, further comprising a polarization conversion element that is disposed downstream of said integrator lens and that polarization-converts light passing through said integrator lens, and
   a condenser lens that is disposed downstream of said polarization conversion element and that condenses light passing through said polarization conversion element to said light valve,
   wherein said shutter mechanism is disposed between said integrator lens and said polarization conversion element.

4. The projection display apparatus according to claim 1, further comprising a polarization conversion element that is disposed downstream of said integrator lens and that polarization-converts light passing through said integrator lens, and
   a condenser lens that is disposed downstream of said polarization conversion element and that condenses light passing through said polarization conversion element to said light valve,
   wherein said shutter mechanism is disposed between said polarization conversion element and said condenser lens.

5. The projection display apparatus according to claim 1, further comprising a polarization conversion element that is disposed downstream of said integrator lens and that polarization-converts light passing through said integrator lens,
   and a condenser lens that is disposed downstream of said polarization conversion element and that condenses light passing through said polarization conversion element to said light valve,
   wherein said shutter mechanism is disposed in a vicinity of said condenser lens.

6. The projection display apparatus according to claim 1, wherein said cuts are of a concave-curve shape.

7. The projection display apparatus according to claim 1, wherein said cuts are of an approximately parabolic shape.

8. The projection display apparatus according to claim 1, wherein said cuts are of an approximately semi-elliptical shape.

* * * * *